(12) United States Patent
Jonsson (10) Patent No.: US 10,841,095 B2
(45) Date of Patent: Nov. 17, 2020

(54) SECURE DATA TRANSFER

(71) Applicant: SAAB AB, Linköping (SE)

(72) Inventor: Mats Jonsson, Sollentuna (SE)

(73) Assignee: SAAB AB, Linköping (SE)

( * ) Notice: Subject to any disclaimer, the term of this patent is extended or adjusted under 35 U.S.C. 154(b) by 41 days.

(21) Appl. No.: 15/556,669

(22) PCT Filed: Mar. 9, 2015

(86) PCT No.: PCT/SE2015/050260
§ 371 (c)(1),
(2) Date: Sep. 8, 2017

(87) PCT Pub. No.: WO2016/144217
PCT Pub. Date: Sep. 15, 2016

(65) Prior Publication Data
US 2018/0069701 A1    Mar. 8, 2018

(51) Int. Cl.
*H04L 29/06*    (2006.01)
*H04L 9/32*    (2006.01)
(Continued)

(52) U.S. Cl.
CPC .............. *H04L 9/3226* (2013.01); *H04L 9/14* (2013.01); *H04L 61/2007* (2013.01);
(Continued)

(58) Field of Classification Search
CPC ..... H04L 9/3226; H04L 61/2007; H04L 9/14; H04L 63/04; H04L 63/061;
(Continued)

(56) References Cited

U.S. PATENT DOCUMENTS

| 6,477,665 | B1 * | 11/2002 | Bowman-Amuah ... G06F 11/22 712/244 |
| 2003/0177382 | A1 | 9/2003 | Ofek et al. |

(Continued)

FOREIGN PATENT DOCUMENTS

| EP | 2512093 A1 | 10/2012 |
| WO | 0182548 A2 | 11/2001 |

OTHER PUBLICATIONS

International Search Report of PCT/SE2015/050260, dated Nov. 23, 2015.

*Primary Examiner* — Carl G Colin
*Assistant Examiner* — Hany S. Gadalla
(74) *Attorney, Agent, or Firm* — Venable LLP; Jeffri A. Kaminski (57) ABSTRACT

The disclosure relates to a system, devices and methods for distributing and using a communication scheme to enable secure communication between communication nodes in a network. A method comprises determining, in the network node, a set of available IP addresses and a set of ports, dividing, in the network node, a time frame in time slots, associating, in the network node, each time slot with an IP address, with a port associated with the IP address and with a unique cryptographic key, distributing, from the network node, the communication scheme to the communication node, receiving, in the communication node, the communication scheme and communicating, in the communication node, with another communication node in possession of a corresponding communication scheme by hopping between the IP addresses and ports according to the communication scheme and encrypting the communication using the unique cryptographic key.

22 Claims, 6 Drawing Sheets

(51) Int. Cl.
*H04L 9/14* (2006.01)
*H04L 29/12* (2006.01)

(52) U.S. Cl.
CPC .......... *H04L 63/04* (2013.01); *H04L 63/0428* (2013.01); *H04L 63/061* (2013.01); *H04L 69/162* (2013.01)

(58) Field of Classification Search
CPC ............... H04L 63/0428; H04L 69/162; H04L 29/06925; H04L 63/1416; H04L 63/1458
See application file for complete search history.

(56) References Cited

U.S. PATENT DOCUMENTS

| | | | | |
|---|---|---|---|---|
| 2007/0070996 | A1* | 3/2007 | Oran | H04L 63/18 370/389 |
| 2007/0073838 | A1* | 3/2007 | Shizuno | H04L 47/2441 709/217 |
| 2008/0313348 | A1 | 12/2008 | Morris et al. | |
| 2010/0095367 | A1* | 4/2010 | Narayanaswamy | H04L 63/0245 726/12 |
| 2010/0296441 | A1* | 11/2010 | Barkan | H04W 12/08 370/328 |
| 2011/0191442 | A1* | 8/2011 | Ovsiannikov | H04L 63/0272 709/218 |
| 2011/0277032 | A1* | 11/2011 | Vargas | H04L 63/0428 726/23 |
| 2012/0284768 | A1* | 11/2012 | Sabin | H04L 63/0428 726/1 |
| 2013/0114400 | A1* | 5/2013 | Zhang | H04L 43/16 370/224 |
| 2016/0036691 | A1* | 2/2016 | Ganga | H04L 63/1408 709/242 |
| 2016/0192194 | A1* | 6/2016 | Yang | H04W 12/0802 713/171 |
| 2018/0069701 | A1* | 3/2018 | Jonsson | H04L 9/14 |

* cited by examiner

| 100 | 200 | 300 | 400 |
|-----|-----|-----|-----|
| 110 | 210 | 310 | 410 |
| 120 | 220 | 320 | 420 |
| 130 | 230 | 330 | 430 |
| 140 | 240 | 340 | 440 |
| 150 | 250 | 350 | 450 |
| ... | ... | ... | ... |

FIG. 4

| 120 | 220 | 320 | 420 |
|-----|-----|-----|-----|
| 130 | 230 | 330 | 430 |
| 140 | 240 | 340 | 440 |

SECURE DATA TRANSFER

CROSS-REFERENCES TO RELATED APPLICATIONS

This application is a U.S. National Stage application of PCT/SE2015/050260, filed 9 Mar. 2015 and published on 15 Sep. 2016 as WO 2016/144217, hereby incorporated by reference in its entirety.

TECHNICAL FIELD

The present disclosure relates generally to a system, devices and methods thereof for providing a way to enable secure communication between communication nodes in a network.

BACKGROUND

With basically the whole world connected to the internet, an increasing issue is to secure the communicated information. Communicated information is at risk at being interrupted and/or compromised by external attackers.

Denial-of-Service, DoS, attacks are one of the most common ways to make resources unavailable to intended users. DoS attacks are commonly executed by saturating the target machine with communication requests so that it cannot handle the communication to the intended users. Specifically, a DoS attack is often directed at a specific port of a specific IP address.

The risk of having communicated information compromised, e.g. tapped or changed by an external part, is especially a big problem for companies with trade secrets and for the military.

Several methods exist to prevent attacks or at least to make it difficult to perform attacks. U.S. Pat. No. 8,301,789 B2 describes one example of such a method. The document describes a port hopping technique where ports are dynamically switched during a communication session between two devices. The decision to switch ports is based on data length or packet count of a given transaction.

One drawback with the above method is that the number of ports is very limited so an attacker may for example perform a DoS attack on all ports to interrupt the communication. The switching also requires computational power of the device when they determine when and where to switch.

There is always the need to reduce the risk of external attacks and to make communication as secure and fool proof as possible. With increasing use of temporary subscriptions to, for example, the use of computer games, there is also a need to provide secure ways of controlling access to data by external users.

SUMMARY

With the above description in mind, then, an aspect of the present invention is to provide a system, devices and methods thereof, which seek to mitigate, alleviate, or eliminate one or more of the above-identified deficiencies in the art and disadvantages singly or in any combination.

These and further objects are achieved by a method in a system, and devices, for distributing and using a communication scheme to provide a way to enable secure communication between communication nodes. The communication is both secure and robust and easy for a system owner to control.

The present disclosure is defined by the appended claims. Various advantageous embodiments of the disclosure are set forth by the appended claims as well as by the following description and the accompanying drawings.

According to some aspects the disclosure provides for a method performed in a system of a network node and at least one communication node.

According to some aspects, the method comprises:
determining, in the network node, a set of available Internet Protocol, IP, addresses and a set of ports associated with each IP address;
dividing, in the network node, a time frame in time slots;
associating, in the network node, each time slot with an IP address of the available IP addresses, with a port associated with the IP address and with a unique cryptographic key, thereby setting up a communication scheme for secure communication;
distributing, from the network node, the communication scheme to the at least one communication node;
receiving, in the at least one communication node, the communication scheme from the network node;
communicating, in one of the at least one communication nodes, with another communication node in possession of a corresponding communication scheme by hopping between the IP addresses and ports according to the communication scheme and encrypting the communication using the unique cryptographic key.

By performing the above steps, a way to enable secure communication between communication nodes is provided. The communication scheme is set up and distributed so that the communication nodes to be communicating know how and when to use what addresses and ports. By combining address hopping, port hopping and unique cryptographic keys, it is extremely hard, if not impossible, for an external entity to intercept all communication between end users. It is equally hard to perform a Denial-of-Service, DoS, attack. The time slots of communication scheme are determined by the system owner so it is easy for the owner to control the timing of all communication and to cancel communications, as will be described later.

According to some aspects the communication node is an communication end node. Thus secure communication between communication end nodes is provided.

According to some aspects the communication node is an intermediate communication node, such as a network router. If intermediate communication nodes communicate according to a communication scheme, the route for communication between communication end nodes will continuously change. Thus, the security of the communication is increased.

According to some aspects the method comprises:
continuously updating routing tables in the intermediary communication node based on the communication scheme.

By continuously updating the routing table according to the communication scheme it is ensured that the communication is sent the right way to end up at the right communication end node.

According to some aspects the disclosure provides for a method performed in a network node, for distributing a communication scheme to provide a way to enable secure communication between communication nodes.

According to some aspects, the method comprises:
determining a set of available Internet Protocol, IP, addresses and a set of ports associated with each IP address;
dividing a time frame in time slots;

associating each time slot with an IP address of the available IP addresses, with a port associated with the IP address and with a unique cryptographic key, thereby setting up a communication scheme for secure communication; and distributing the communication scheme to at least one communication node.

Thus, the communication scheme is set up and distributed by the network node.

According to some aspects the distributing comprises:
storing the communication scheme on a physical entity; and
physically distributing the physical entity with the communication scheme stored thereon to the at least one communication node.

By physically distributing the communication scheme, it is ensured that the number of communication nodes in possession of the communication scheme is controlled. It is also easy to know if the communication scheme has been compromised by losing one of the physical entities. In other words, the physical distribution of the communication scheme ensures a more secure system.

According to some aspects the associating comprises that the combination of an IP address and port are different in adjacent time slots. If they are the same, the time the system uses the same combination of address and port may be long enough to initiate a DoS attack or to get hold of valuable information.

According to some aspects the associating comprises to associate each time slot with a random IP address of the available IP addresses and with a random port associated with the random IP address. In other words, the assigning of IP address and port to the time slots is random so that there can be no way to predict the communication scheme.

According to some aspects the network node is a communication node. Hence, method to produce the communication scheme is performed in a communication node and the communication scheme is then distributed to the other communication node with which the communication node will communicate.

According to some aspects the network node is a server and the disturbing comprises distributing the communication scheme to at least two communication nodes to enable the at least two communication nodes to communicate with each other securely. The server may then be a control central for all communication schemes and handle which end notes will communication with what communication scheme and also control cancellations of communication schemes.

According to some aspects the unique cryptographic key is unique for all time slots. For maximum security the unique cryptographic key is never reused.

According to some aspects at least two time slots comprise unequal length with respect to one another. In other words, the time slots do not need to be the same length. This can be used to further thwart attempts to compromise the communication.

According to some aspects the time slots are any length between 10 and 30 seconds or 30 and 59.9 seconds. Too short time lengths will heavily burden routers which will have to update address lists very often. Too long times will give potential interceptors more time to compromise the communication.

According to some aspects wherein the method comprises:

changing the communication scheme in at least one of the at least one communication nodes to disable communication between the communication nodes using that communication scheme.

If the communication nodes do not have the same communication scheme, communication will be disabled. This is useful if the network node suspects that the communication between communication nodes has been compromised or if one of the communication nodes is no longer trusted.

According to some aspect the distributing comprises to distribute a communication scheme which comprises a limited communication scheme based on a second time frame, which second time frame is a subframe of the time frame, for time limited access to the secure communication. In other words, it is possible to provide a communication node with a communication scheme limited in time.

According to some aspects the disclosure provides for a method performed in a communication node, for using a communication scheme to provide a way to enable secure communication between communication nodes.

According to some aspect the method comprises:
receiving a communication scheme from a network node, wherein the communication scheme comprises a set of time slots, wherein each time slot is associated with an IP address of a set of available IP addresses, with a port associated with the IP address and with a unique cryptographic key; and
communicating with another communication node in possession of a corresponding communication scheme by hopping between the IP addresses and ports according to the communication scheme and encrypting the communication using the unique cryptographic key.

Hence, the communication node is enabled to communicate according to the communication scheme.

According to some aspects the disclosure provides for a system of a network node and at least one communication node.

According to some aspect the network node comprises communication circuitry and processing circuit. The processing circuitry is configured to:
determine a set of available Internet Protocol, IP, addresses and a set of ports associated with each IP address;
divide a time frame in time slots;
associate each time slot with an IP address of the available IP addresses, with a port associated with the IP address and with a unique cryptographic key, thereby setting up a communication scheme for secure communication; and
distribute, via the communication circuitry, the communication scheme to at least one communication node.

The at least one communication node comprises communication circuitry and processing circuit. The processing circuitry is configured to:
receive, via the communication circuitry, a communication scheme from a network node, wherein the communication scheme comprises a set of time slots, wherein each time slot is associated with an IP address of a set of available IP addresses, with a port associated with the IP address and with a unique cryptographic key; and
communicate, via the communication circuitry, with another communication node in possession of a corresponding communication scheme by hopping between the IP addresses and ports according to the communication scheme and encrypting the communication using the unique cryptographic key.

The advantages have been previously discussed.

According to some aspects the disclosure provides for a network node.

According to some aspect the network node comprises communication circuitry and processing circuit. The processing circuitry is configured to:
- determine a set of available Internet Protocol, IP, addresses and a set of ports associated with each IP address;
- divide a time frame in time slots;
- associate each time slot with an IP address of the available IP addresses, with a port associated with the IP address and with a unique cryptographic key, thereby setting up a communication scheme for secure communication; and
- distribute the communication scheme to at least one communication node.

The advantages have been previously discussed.

According to some aspects the disclosure provides for a communication node.

According to some aspects the communication node comprises communication circuitry and processing circuit. The processing circuitry is configured to:
- receive a communication scheme from a network node, wherein the communication scheme comprises a set of time slots, wherein each time slot is associated with an IP address of a set of available IP addresses, with a port associated with the IP address and with a unique cryptographic key; and
- communicate with another communication node in possession of a corresponding communication scheme by hopping between the IP addresses and ports according to the communication scheme and encrypting the communication using the unique cryptographic key.

The advantages have been previously discussed.

According to some aspects the disclosure provides for a non-transitory computer readable medium, which, when executed on a network node, causes the network node to perform the method according to above when discussing the network node.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Aspects of the present disclosure will be described more fully hereinafter with reference to the accompanying drawings. The device and method disclosed herein can, however, be realized in many different forms and should not be construed as being limited to the aspects set forth herein.

The terminology used herein is for the purpose of describing particular aspects of the disclosure only, and is not intended to limit the invention. As used herein, the singular forms "a", "an" and "the" are intended to include the plural forms as well, unless the context clearly indicates otherwise.

Embodiments of the present invention will be exemplified using a network node and a communication node such as a mobile phone or a router. However, it should be appreciated that the invention is as such equally applicable to any communication devices which may function as a network node or a communication node over a communication network. Examples of such devices may for instance be any type of mobile phone, smartphone, laptop (such as standard, ultra portables, netbooks, and micro laptops), handheld computers, portable digital assistants, tablet computers, touch pads, gaming devices, accessories to mobile phones, e.g. wearable communication devices in the form of headphones/-sets, visors/goggles, bracelets, wristbands, necklaces, watches, headbands, rings, etc. It should be noted that a communication device is any communication device equipped with communication means and can be e.g. a camera, a lamp post or vehicle.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 1:
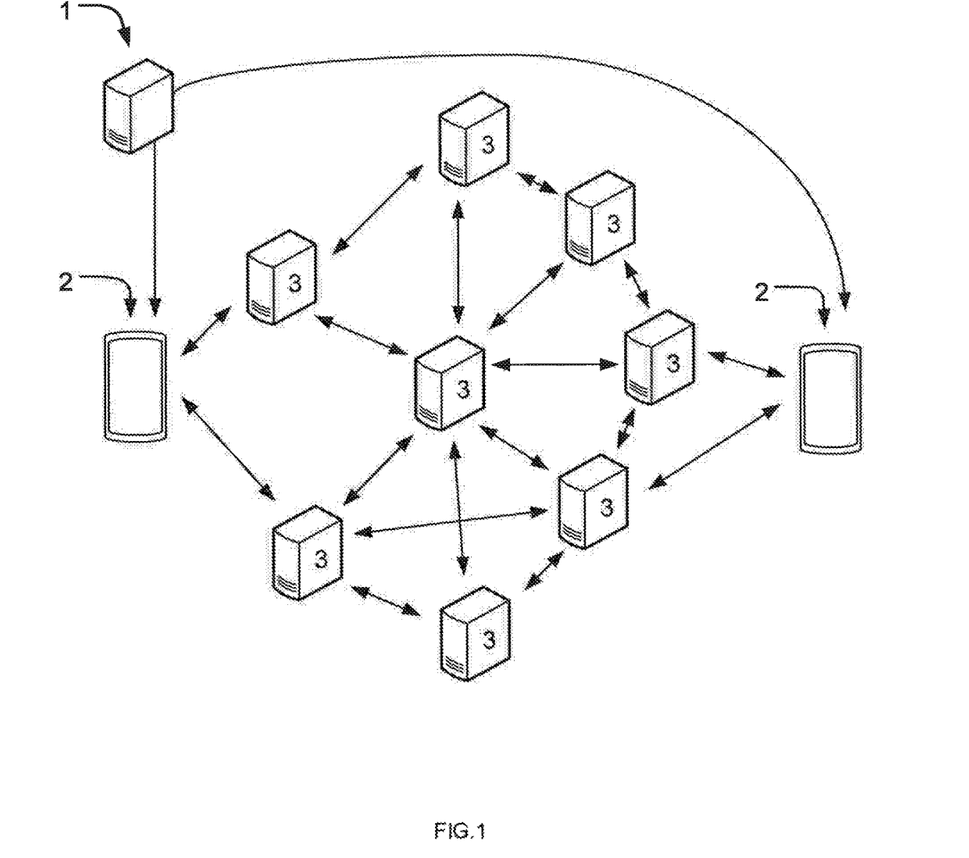
FIG. 1 illustrates an example of two communication end nodes communicating over a network of communication nodes with a communication scheme received from the network node, FIG. 2 illustrate an example of a network node, FIG. 3 illustrate an example of a communication node, FIG. 4 illustrate an example of a communication scheme, FIG. 5 illustrate an example of a limited communication scheme.

FIG. 1 shows an example of a system, for distributing and using a communication scheme 4 to provide a way to enable secure communication between communication nodes, with communication end nodes 2 communicating over a network of intermediary communication nodes 3 with one or several communication schemes received from a network node 1. By establishing a common communication scheme for the two communication end nodes they can communicate securely and continuously during a time set by a system owner. By also providing corresponding communication schemes to the intermediary communication nodes in between the communication end nodes, the security is further increased by providing a way to change every step of a communication path between to communication end nodes regularly according to the communication schemes.

Figure 2:
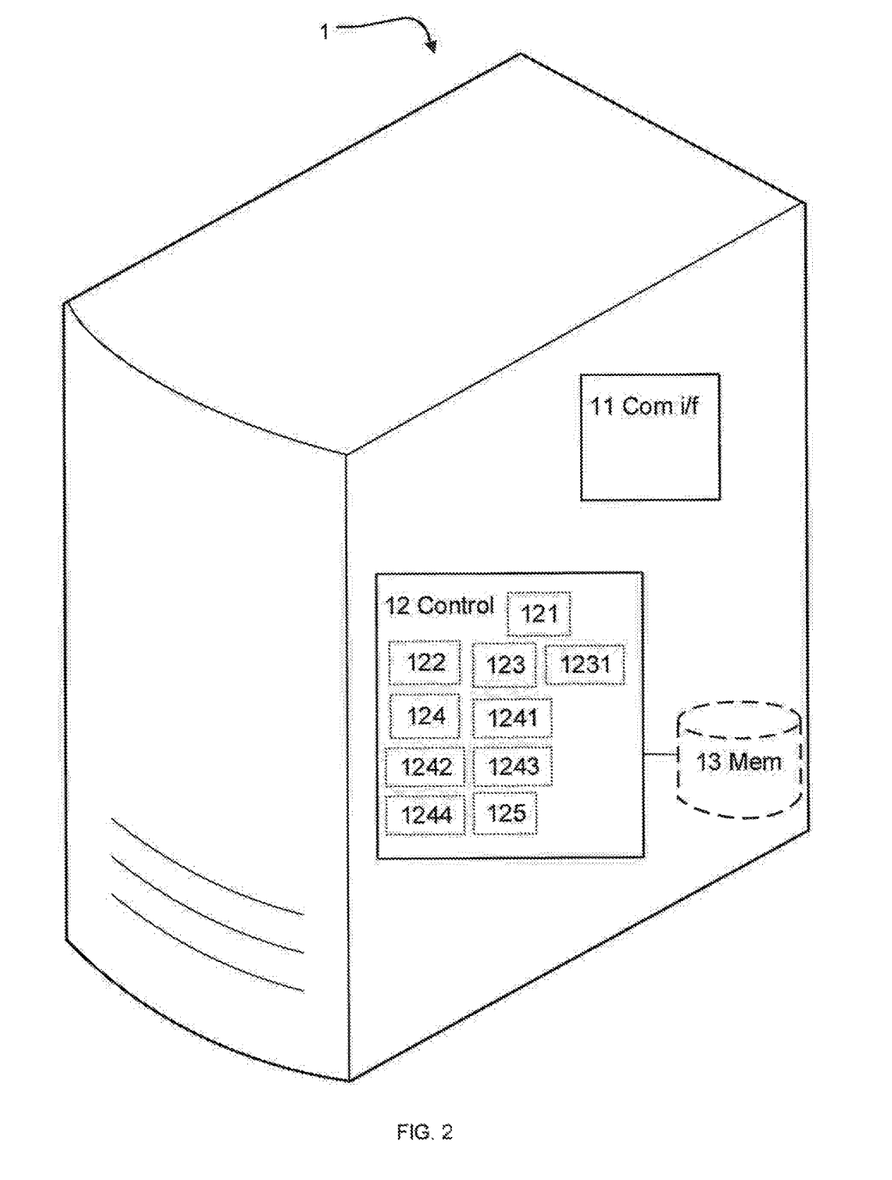

FIG. 2 shows a network node 1, for distributing a communication scheme 4 to provide a way to enable secure communication between communication nodes 2, 3, according to some aspects of the disclosure. The figure illustrates a network node comprising communication circuitry 11 and processing circuit 12. The network node further comprises a memory 13 for storing data. The memory may be any type of memory suitable for a wireless communication device.

Figure 3:
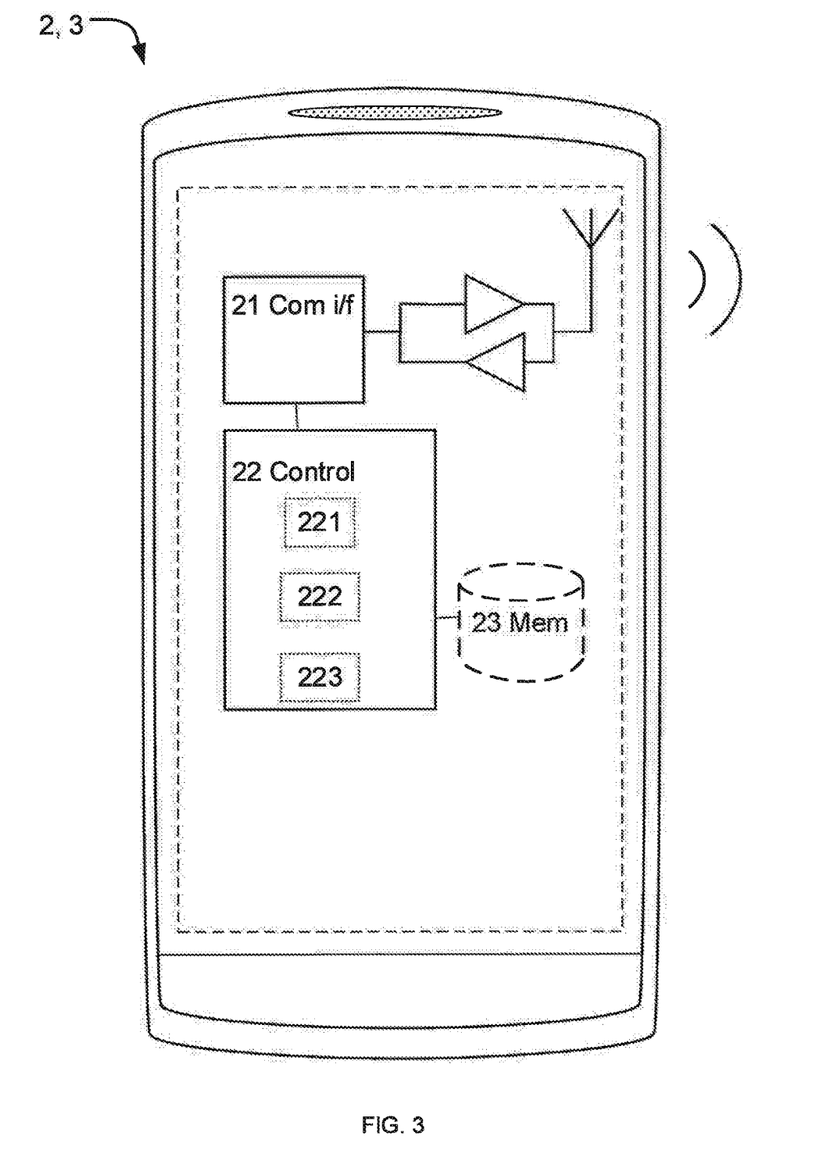

FIG. 3 shows a communication node 2, 3, for using a communication scheme 4 to provide a way to enable secure communication between communication nodes, according to some aspects of the disclosure. The figure illustrates a communication node comprising communication circuitry 21 and processing circuit 22. The communication node further comprises a memory 23 for storing data. The memory may be any type of memory suitable for a wearable communication device.

It should be noted that the network node may take the form of the communication node of FIG. 3 and the communication node may take the form of the network node of FIG. 2.

Figure 4:
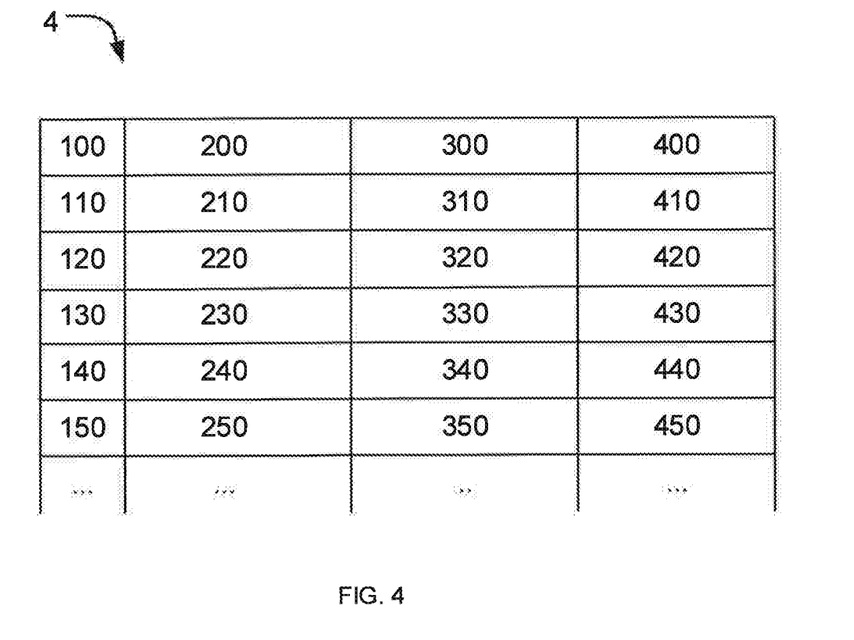
Figure 5:
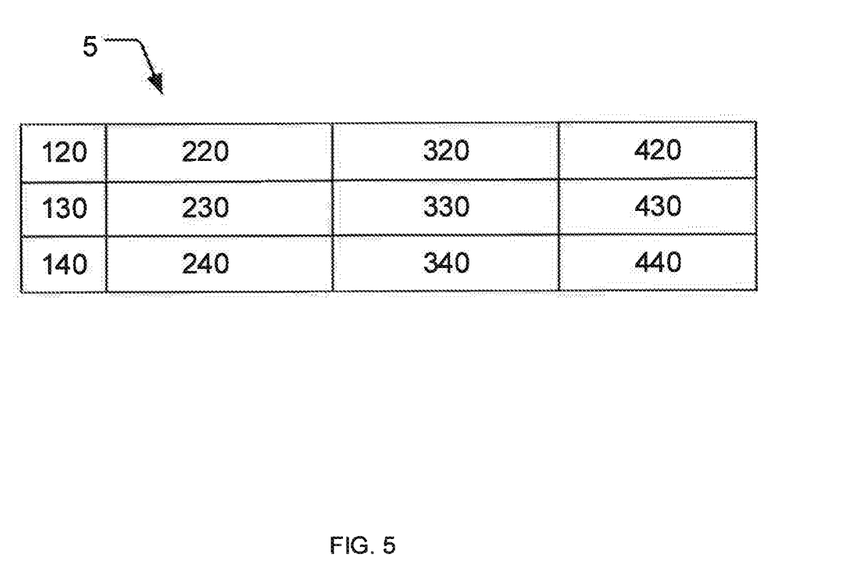

FIGS. 4 and 5 shows examples of communication schemes according to some aspects of the disclosure.

Figure 6:
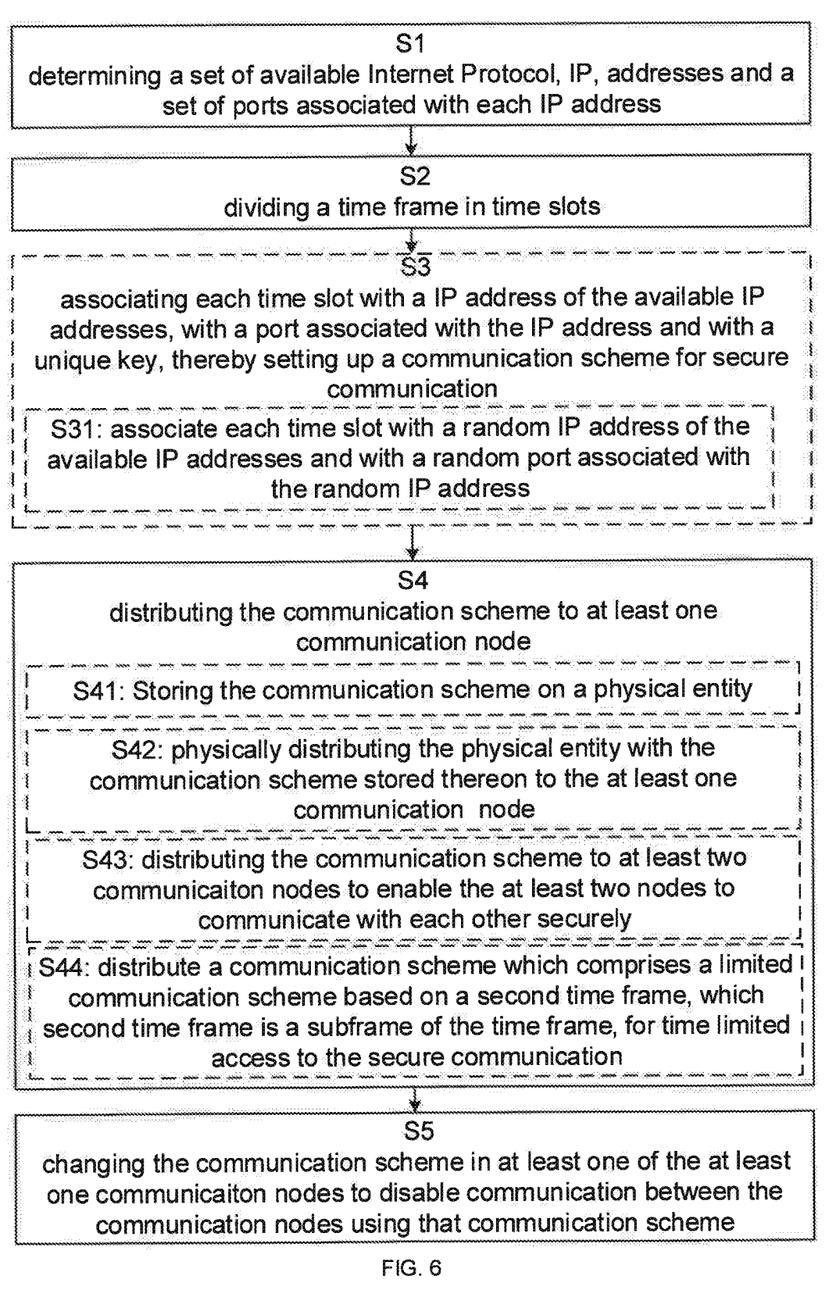
FIG. 6 is a flow chart illustrating the proposed method, performed in the network node.
Figure 7:
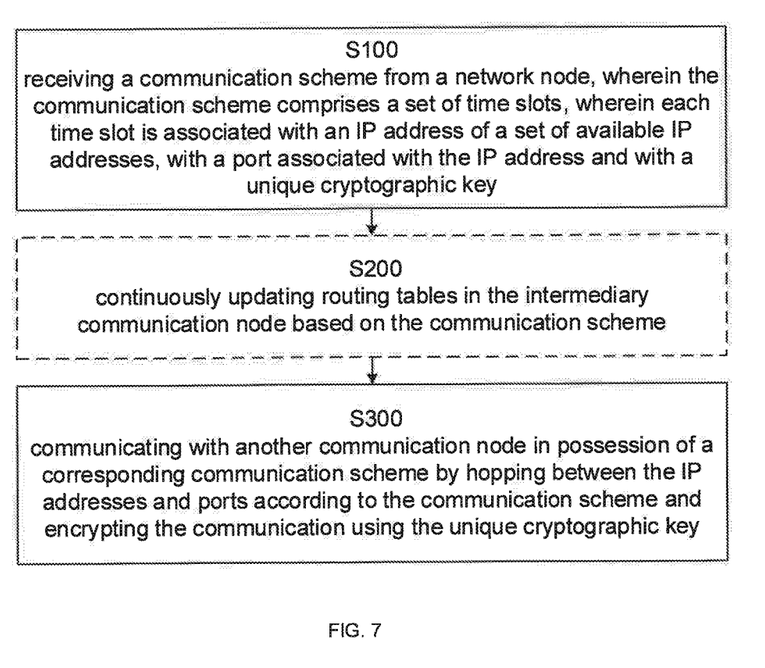
FIG. 7 is a flow chart illustrating the proposed method, performed in the communication node.

FIG. 6 is a flow diagram depicting example operations which may be taken by the network node. FIG. 7 is a flow diagram depicting example operations which may be taken by the communication node. All steps of the flow diagrams will be described hereafter, with reference to all of the drawings, in a logical order of the steps and not in the order of which device performs which steps.

The method of the system of a network node 1 and at least one communication node 2, 3 comprises to determine S1, in the network node, a set of available Internet Protocol, IP, addresses and a set of ports associated with each IP address. According to some aspects, the processing circuitry 12 of the network node is configured to determine S1 the set of available Internet Protocol, IP, addresses and a set of ports associated with each IP address According to some aspects, the processing circuitry comprises a determining unit 121 for the determining. The determining of available IP addresses comprises for example to check a list of available IP addresses. According to some aspects, it is up to the owner of the system to provide a list of available IP addresses. It may also comprise to order a new set of IP addresses of an external provider.

The method further comprises to divide S2, in the network node 1, a time frame in time slots. According to some aspects, the processing circuitry 12 of the network node is configured to divide S2 the time frame in time slots. According to some aspects, the processing circuitry comprises a divider 122 for the dividing. The time frame may be any time frame and is set according to how long the system owner wants the system to be in use. If a system owner wants the system to work for a long time, the time frame is for example 60 years. If the system owner wants the system to be limited to a shorter time, the time frame is for example 1 year or any time frame decided upon by the system owner.

The length of the time slots is also determined by the system owner. According to some aspects the time slots are any length between 10 and 30 seconds or 30 and 59.9 seconds. Too short time lengths will heavily burden routers 3 which will have to update address lists very often. Too long times will give potential interceptors more time to compromise the communication. Port scanning by an interceptor takes about 60 seconds so a time slot is preferentially shorter than 60 seconds.

According to some aspects at least two time slots comprise unequal length with respect to one another. In other words, the time slots do not need to be the same length. As an example, one time slot may be 10 seconds and another time slots may be 30 seconds. This can be used to further thwart attempts to compromise the communication.

The method further comprises to associate S3, in the network node 1, each time slot with an IP address of the available IP addresses, with a port associated with the IP address and with a unique cryptographic key, thereby setting up a communication scheme 4 for secure communication. According to some aspects, the processing circuitry 12 of the network node is configured to perform the associating S3. According to some aspects, the processing circuitry comprises an associating unit 123 for the associating. The communication scheme is for example a list as illustrated in FIG. 4, where the first row 100, 110, 120, etc. comprises a list of the time slots, the second row 200, 210, 220 etc. comprises a list of IP addresses, the third row 300, 310, 320 etc. comprises a list of ports and the fourth row 400, 410, 420 etc. comprises unique cryptographic keys. The communication scheme comprises time slots associated with IP addresses, port numbers and cryptographic keys which the communication nodes shall use to communicate. According to some aspects the associating S3 comprises that the combination of an IP address and port are different in adjacent time slots. In other words, they may not be the same in adjacent time slots. If they are the same, the time the system uses the same combination of address and port may be long enough to initiate a DoS attack or to get hold of valuable information.

For an unpredictable system the associating S3 comprises, according to some aspects, to associate S31 each time slot with a random IP address of the available IP addresses and with a random port associated with the random IP address. According to some aspects, the processing circuitry 12 of the network node is configured to associate S31 the time slots with random IP addresses and ports. According to some aspects, the processing circuitry comprises an associating unit 1231 for the associating. In other words, the assigning of IP address and port to the time slots is random, or at least pseudo random, so that there is no way to predict the communication scheme 4.

According to some aspects the unique cryptographic key is unique for all time slots. For maximum security the unique cryptographic key is never reused.

The method further comprises to distribute S4, from the network node 1, the communication scheme to the at least one communication node 2, 3. According to some aspects, the processing circuitry 12 of the network node is configured to distribute S4 the communication scheme. According to some aspects, the processing circuitry comprises a distributor 124 for the distributing. Thus, the communication scheme is set up and distributed by the network node.

For a way to control the distribution S4 the distributing S4 comprises storing S41 the communication scheme 4 on a physical entity and physically distributing S42 the physical entity with the communication scheme stored thereon to the at least one communication node. According to some aspects, the processing circuitry 12 of the network node is configured to store S41 the communication scheme and to physically distribute S42 the physical entity. According to some aspects, the processing circuitry comprises a storing unit 1241 and a physical distributer 1242. The physical entity is for example a YubiKey™. A YubiKey™ is a device that you register with a service that supports two-factor authentication. Two-factor authentication means that each time you log in, the service will request proof that you have your YubiKey™ in addition to your regular username and password.

By physically distributing the communication scheme, it is ensured that the number of communication nodes in possession of the communication scheme is controlled. It is also easy to know if the communication scheme has been compromised by losing one of the physical entities. In other words, the physical distribution of the communication scheme ensures a more secure system.

As opposed to distributing the communication scheme physically, the communication scheme is, according to some aspects, distributed digitally over a secure channel to the at least one communication node. It might be considered easier for a system owner to distribute the communication scheme digitally than to distribute it physically. According to some aspects, one part of the communication scheme is distributed physically and a second part is distributed digitally. Both parts of the communication scheme are then required at the communication node to be useable.

It is possible that the network node wishes to communicate securely using a communication scheme, then, according to some aspects, the network node is a communication node. Hence, method to produce the communication scheme 4 is performed in a communication node and the communication scheme is then distributed to the other communication nodes which will be part of the routing path between the communication end nodes.

If the network node 1 is to enable two other devices, i.e. communication nodes 2, 3, to communicate, the network node, according to some aspects, is a server and the disturbing S4 comprises distributing S43 the communication scheme 4 to at least two communication nodes to enable the at least two communication nodes to communicate with each other securely. According to some aspects, the processing circuitry 12 of the network node is configured to distribute S43 the communication scheme. According to some aspects, the processing circuitry comprises a distributing unit 1243 for distributing. The server may then be a control central for all communication schemes and handle which end notes will communicate with what communication scheme and also control cancellations of communication schemes. Note that more than two communication end nodes cannot communicate with each other using the same communication scheme at the same time because then there would be an address conflict. This is not true when one communication node is broadcasting data; then several communication nodes can listen to the broadcasting communication node. According to some aspects the network node may be unconnected to any network and only distribute the communication scheme physically. In this way, the network node is non-compromisable by network attacks.

In some cases the service owner may want to put a time limit on certain communication nodes. The distributing S4 comprises, according to some aspects, to distribute S44 a communication scheme which comprises a limited communication scheme 5 based on a second time frame, which second time frame is a subframe of the time frame, for time limited access to the secure communication. According to some aspects, the processing circuitry 12 of the network node is configured to distribute S44 the communication scheme. According to some aspects, the processing circuitry comprises a distributer 1244 for distributing. In other words, it is possible to provide a communication node with a communication scheme limited in time. This is used with, for example, time limited subscriptions. An example of a time limited subscription is when a user has bought time limited access to a game. Another example is when one main communication end node is to receive regular updates from several other communication end nodes. The main communication end node then has a complete communication scheme and the other communication end nodes only has the communication scheme for the time slots that they are to use to send updates to the main communication end node. The capacity of the main communication end node does not have to be so large then since it only receives one report at the time and it will not be possible for the other communication end nodes to send anything during the times that their communication scheme does not cover. The limited communication scheme is for example a list as illustrated in FIG. 5, where the first row 120, 130, 140 comprises a list of the time slots, the second row 220, 230, 240 comprises a list of IP addresses, the third row 320, 330, 340 comprises a list of ports and the fourth row 420, 430, 440 comprises unique cryptographic keys.

The method further comprises to receive 5100, in the at least one communication node 2, 3, the communication scheme 4, 5 from the network node. According to some aspects, the processing circuitry 22 of the communication node is configured to receive 5100 the communication scheme. According to some aspects, the processing circuitry comprises a receiver 221 for receiving. As previously discussed, the communication scheme is either distributed digitally of physically, so the communication scheme is according to some aspects received digitally and according to some aspects physically.

The method further comprises to communicate 5300, in one of the at least one communication nodes 2, 3, with another communication node in possession of a corresponding communication scheme by hopping between the IP addresses and ports according to the communication scheme and encrypting the communication using the unique cryptographic key. According to some aspects, the processing circuitry 22 of the communication node is configured to communicate 5300, via the communication circuitry 21, with another communication node. According to some aspects, the processing circuitry comprises a communicator 223 for communicating. By communicating using the communication scheme, a secure communication is ensured.

When hopping between addresses and ports, there is, according to some aspects, a small overlap in the time slots. The overlap is to provide time for the communicating communication nodes to inform connected communication nodes 3 of the address and port change so that communication is not interrupted. Network equipment between communicating communication nodes is informed of changes to IP addresses and ports prior to address hops such that uninterrupted communication between communication nodes is maintained.

The communication nodes will only be able communicate during the time slots where the communication scheme is the same. So if the communication scheme is only partially the same, only the parts that are the same will be used for communication.

By performing the above, a way to enable secure communication between communication nodes is provided. The communication scheme is set up and distributed so that the communication nodes to be communicating know how and when to use what addresses and ports. By combining address hopping, port hopping and unique cryptographic keys, it is extremely hard, if not impossible, for an external entity to intercept all communication between end users. It is equally hard to perform a Denial-of-Service, DoS, attack.

The communication node is an communication end node 2 according to some aspects. Thus secure communication between communication end nodes is provided. An communication end node should be interpreted as the communication node that is the first sender or final receiver of a communication. It should be noted that the disclosure may be used only in the communication end nodes and let regular routers handle the communication path between the communication end nodes.

According to some aspects the communication node is an intermediate communication node 3, such as a network router. An intermediate communication node should be interpreted as a communication node that passes a communication along, i.e. it is not the first sender or the final receiver of a communication. If intermediate communication nodes communicate according to a communication scheme, the route for communication between communication end nodes will continuously change. Thus the security of the communication is increased.

When both the communication end nodes and intermediary communication nodes communicate according to communication schemes one of the communication end nodes sends a communication to an intermediary communication node, the communication node will pass the communication to the next intermediary communication node according to a communication scheme in the intermediary communication node. The communication schemes in the intermediary communication nodes are arranged so that the path taken by the communication from one communication end node to another communication end node continuously changes but so that there is always a continuous route between the communication end nodes. In other words, even if the route changes so that the communication is sent via different routes, there is always a continuous train of intermediary communication nodes for the communication to reach the communication end nodes. Looking at FIG. 1, when the two communication end nodes 2 are communicating, there are several possible routes over the intermediary communication nodes 3. The route will be predetermined using communication schemes and will change for every time slot. Thus the route may be any route between the communication end nodes. It should be noted that the communication schemes in the intermediary communication nodes may be distributed before placing the intermediary communication nodes at their location. In other words, the intermediary communication nodes have communication schemes stored before placing the communication nodes at their routing position. The network node has then distributed the communication schemes to the intermediary communication nodes before placing them. An advantage with having an entire route between communication end nodes that continuously changes path, or routing path, is that it is almost impossible for an external attacker to intercept the communication on its way; because the way is not set.

Note that, according to some aspects, the communication end nodes will communicate with a communication scheme with several different IP addresses to the same communication end node. In other words, the IP addresses of the communication scheme are just different IP addresses to the same communication end node. In the case of intermediary communication nodes, when an intermediary communication node changes the IP address it is sending to, the communication node sends the communication to a different communication node. I.e. the IP addresses of the intermediary communication nodes do not change.

When the communication node is an intermediary communication node, the method comprises, according to some aspects, to continuously updating 5200 routing tables in the intermediary communication node 3 based on the communication scheme. According to some aspects, the processing circuitry 22 of the communication node is configured to update 5200 the routing tables. According to some aspects, the processing circuitry comprises an updating unit 222 for updating.

By continuously updating the routing table according to the communication scheme, it is ensured that the communication is sent the right way to end up at the right communication end node. The term continuously here means that the routing tables are updated for each time slot.

By using the method not only in the communication end nodes, but also in intermediate communication nodes, security is increased further. The whole route, in every intermediary communication node, from communication end node to communication end node will then hop for every time slot. The time slots of communication scheme are determined by the system owner so it is easy for the owner to control the timing of all communication and to cancel communications, as will be described later.

According to some aspects, the intermediate communication nodes prevents from getting distracted by communications other than the ones using communication schemes according to this disclosure by only listening to ports specified in the communication schemes and/or using a known cryptographic key.

Note that the communication schemes will be the same in the communication end nodes but in the intermediary communication nodes the communication schemes will be corresponding to make sure that communications are routed to the right communication end node. It should also be noted that, according to some aspects, the intermediary communication nodes does not need to know the final destination of a communication to send it to the next router since the whole routing path is already determined in the scheme.

For cancelling communication with an end the method comprises, according to some aspects, changing S5 the communication scheme 4, 5 in at least one of the at least one communication nodes to disable communication between the communication nodes using that communication scheme. According to some aspects, the processing circuitry 12 of the network node is configured to change S5 the communication scheme. According to some aspects, the processing circuitry comprises a changing unit 125 for changing. The changed communication scheme is distributed to at least one communication node to replace the one already used there. When the communication scheme is changed in an communication end node, communication between the communication end nodes in possession of the now different communication schemes is cancelled. In other words, if the communication end nodes do not have the same communication scheme 4, communication will be disabled. This is useful if the network node suspects that the communication between communication nodes has been compromised or if one of the communication end nodes is no longer trusted or when a subscription of an communication end node runs out. According to some aspects, the communication scheme is erased at one communication end node to prevent from further communication with the other communication end node(s).

According to the above, and according to some aspects, the method of the network node 1 comprises:
determining S1 a set of available Internet Protocol, IP, addresses and a set of ports associated with each IP address;
dividing S2 a time frame in time slots;
associating S3 each time slot with an IP address of the available IP addresses, with a port associated with the IP address and with a unique cryptographic key, thereby setting up a communication scheme for secure communication; and
distributing S4 the communication scheme to at least one communication node.

According to the above, and according to some aspects, the method of the communication node 2, 3 comprises:
receiving S100 a communication scheme from a network node 1, wherein the communication scheme comprises a set of time slots, wherein each time slot is associated with an IP address of a set of available IP addresses, with a port associated with the IP address and with a unique cryptographic key; and
communicating 5300 with another communication node in possession of a corresponding communication scheme by hopping between the IP addresses and ports according to the communication scheme and encrypting the communication using the unique cryptographic key.

Hence, the communication node is enabled to communicate according to the communication scheme.

It should be appreciated that the flow diagrams of FIGS. 6 and 7 comprises some operations which are illustrated with a solid border and some operations which are illustrated with a dashed border. The operations which are comprised in a solid border are operations which are comprised in the broadest example embodiment. The operations which are comprised in a dashed line are example embodiments which may be comprised in, or a part of, or are further operations which may be taken in addition to the operations of the broader example embodiments. It should be appreciated that the operations need not be performed in order. Furthermore, it should be appreciated that not all of the operations need to be performed. Also, the functions or steps noted in the blocks can according to some aspects of the disclosure be executed continuously in a loop.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed. It should further be noted that any reference signs do not limit the scope of the claims, that the example embodiments may be implemented at least in part by means of both hardware and software, and that several "means" or "devices" may be represented by the same item of hardware.

The various example embodiments described herein are described in the general context of method steps or processes, which may be implemented according to some aspects by a non-transitory computer readable medium, which, when executed on a network node, causes the network node to perform one or several of the methods according to above. The computer program, embodied in a computer-readable medium, includes computer-executable instructions, such as program code, executed by computers in networked environments. A computer-readable medium may include removable and non-removable storage devices 13 including, but not limited to, Read Only Memory, ROM, Random Access Memory, RAM, compact discs, CDs, digital versatile discs, DVD, etc. Generally, program modules may include routines, programs, objects, components, data structures, etc. that performs particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A method, performed in a system comprising a network node and at least one communication node, for distributing and using a communication scheme to provide a way to enable secure communication between communication nodes, the method comprises:
    determining, in the network node, a set of available Internet Protocol, IP addresses and a set of ports associated with each IP address of the available IP addresses;
    dividing, in the network node, a time frame in time slots;
    associating, in the network node, each time slot with a random IP address of the available IP addresses, with a random port of the set of ports associated with the random IP address and with a unique cryptographic key prior to initiating a communication, thereby setting up the communication scheme for secure communication; wherein the time slots of the communication scheme are predetermined thereby to control a timing of all communications; distributing, from the network node, the communication scheme to the at least one communication node;
    receiving, in the at least one communication node, the communication scheme from the network node;
    communicating, in one of the at least one communication node, with another communication node in possession of the received communication scheme by hopping between the random IP addresses and random ports according to the communication scheme and encrypting the communication using the unique cryptographic key.

2. The method according to claim 1, wherein the communication node is a communication end node.

3. The method according to claim 1, wherein the communication node is an intermediate communication node, such as a network router.

4. The method according to claim 3, further comprising:
    continuously updating routing tables in the intermediate communication node based on the communication scheme.

5. A method, in a network node, for distributing a communication scheme to provide a way to enable secure communication between communication nodes, the method comprises:
    determining a set of available Internet Protocol, IP addresses and a set of ports associated with each IP address of the available IP addresses;
    dividing a time frame in time slots;
    associating each time slot with a random IP address of the available IP addresses, with a random port of the set of ports associated with the random IP address and with a unique cryptographic key prior to initiating a communication, thereby setting up the communication scheme for secure communication; wherein the time slots of the communication scheme are predetermined thereby to control a timing of all communications; and
    distributing the communication scheme to at least one communication node, thereby to enable communication in one of the at least one communication node, with another communication node in possession of the received communication scheme by hopping between the random IP addresses and random ports according to the communication scheme and encrypting the communication using the unique cryptographic key.

6. The method according to claim 5, wherein the distributing comprises:
storing the communication scheme on a physical entity; and
physically distributing the physical entity with the communication scheme stored thereon to the at least one communication node.

7. The method according to claim 5, wherein the associating comprises that the combination of a random IP address and random port are different in adjacent time slots.

8. The method according to claim 5, wherein the network node is a communication node.

9. The method according to claim 5, wherein the network node is a server and the disturbing comprises distributing the communication scheme to at least two communication nodes to enable the at least two communication nodes to communicate with each other securely.

10. The method according to claim 5, wherein the unique cryptographic key is unique for all time slots.

11. The method according to claim 5, wherein at least two time slots comprise unequal length with respect to one another.

12. The method according to claim 5, wherein the time slots are any length between 10 and 30 seconds or 30 and 59.9 seconds.

13. The method according to claim 5, wherein the method comprises:
changing the communication scheme in at least one of the at least one communication node to disable communication between the communication nodes using that communication scheme.

14. The method according to claim 5, wherein the distributing comprises to distribute a communication scheme which comprises a limited communication scheme based on a second time frame, which second time frame is a subframe of the time frame, for time limited access to the secure communication.

15. A method, in a communication node, for using a communication scheme to provide a way to enable secure communication between communication nodes, the method comprising:
receiving a communication scheme from a network node, wherein the communication scheme comprises a set of time slots, wherein the time slots of the communication scheme are predetermined thereby to control a timing of all communications and wherein each time slot is associated with a random IP address of a set of available IP addresses, with a random port of a set of ports associated with the random IP address and with a unique cryptographic key prior to initiating a communication; and
communicating with another communication node in possession of the received communication scheme by hopping between the random IP addresses and random ports according to the communication scheme and encrypting the communication using the unique cryptographic key.

16. The method according to claim 15, wherein the communication node is a communication end node.

17. The method according to claim 15, wherein the communication node is an intermediate communication node, such as a network router.

18. The method according to claim 17, comprising:
continuously updating routing tables in the intermediate communication node based on the communication scheme.

19. A system of a network node and at least one communication node, wherein the network node comprising:
communication circuitry;
processing circuit configured to:
determine a set of available Internet Protocol, IP addresses and a set of ports associated with each IP address of the available IP addresses;
divide time frame in time slots;
associate each time slot with a random IP address of the available IP addresses, with a random port of the set of ports associated with the random IP address and with a unique cryptographic key prior to initiating a communication, thereby setting up the communication scheme for secure communication; wherein the time slots of the communication scheme are predetermined thereby to control a timing of all communications; and
distribute, via the communication circuitry, the communication scheme to at least one communication node;
and wherein the at least one communication node comprising:
communication circuitry;
processing circuit configured to:
receive, via the communication circuitry, the communication scheme from a network node, wherein the communication scheme comprises a set of time slots, wherein each time slot is associated with an IP address of a set of available IP addresses, with a port associated with the IP address of the available IP addresses and with a unique cryptographic key prior to initiating a communication; and
communicate, via the communication circuitry, with another communication node in possession of communication scheme by hopping between the IP addresses and ports according to the communication scheme and encrypting the communication using the unique cryptographic key.

20. A network node for distributing a communication scheme to provide a way to enable secure communication between communication nodes, comprising:
communication circuitry;
processing circuit configured to:
determine a set of available Internet Protocol, IP addresses and a set of ports associated with each IP address of the available IP addresses;
divide a time frame in time slots;
associate each time slot with a random IP address of the available IP addresses, with a random port of the set of ports associated with the random IP address and with a unique cryptographic key prior to initiating a communication, thereby setting up the communication scheme for secure communication; wherein the time slots of the communication scheme are predetermined thereby to control a timing of all communications; and
distribute the communication scheme to at least one communication node, thereby to enable communication in one of the at least one communication node, with another communication node in possession of the communication scheme by hopping between the random IP addresses and random ports according to the communication scheme and encrypting the communication using the unique cryptographic key.

21. A communication node comprising:

communication circuitry;

processing circuit configured to:
- receive a communication scheme from a network node, wherein the communication scheme comprises a set of time slots, wherein the time slots of the communication scheme are predetermined thereby to control a timing of all communications; and wherein each time slot is associated with a random IP address of a set of available IP addresses, with a random port of the set of ports associated with the random IP address and with a unique cryptographic key prior to initiating a communication; and
- communicate with another communication node in possession of the received communication scheme by hopping between the random IP addresses and random ports according to the communication scheme and encrypting the communication using the unique cryptographic key.

22. A non-transitory computer readable medium having instructions stored which cause a processor to perform operations comprising:
- determining a set of available Internet Protocol, IP addresses and a set of ports associated with each IP address of the available IP addresses;
- dividing a time frame in time slots;
- associating each time slot with a random IP address of the available IP addresses, with a random port of the set of ports associated with the random IP address and with a unique cryptographic key prior to initiating a communication, thereby setting up the communication scheme for secure communication; wherein the time slots of the communication scheme are predetermined thereby to control a timing of all communications; and
- distributing the communication scheme to at least one communication node, thereby to enable communication in one of the at least one communication nodes, with another communication node in possession of the received communication scheme by hopping between the random IP addresses and random ports according to the communication scheme and encrypting the communication using the unique cryptographic key.

* * * * *